United States Patent
Tubillara et al.

(10) Patent No.: US 10,630,539 B2
(45) Date of Patent: Apr. 21, 2020

(54) CENTRALIZED RATE LIMITERS FOR SERVICES IN CLOUD BASED COMPUTING ENVIRONMENTS

(71) Applicant: International Business Machines Corporation, Armonk, NY (US)

(72) Inventors: Elvin D. Tubillara, Austin, TX (US); Edward Shvartsman, Austin, TX (US); Bradley O. Simpson, Pflugerville, TX (US); Shawn P. Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 16/056,621

(22) Filed: Aug. 7, 2018

(65) Prior Publication Data
US 2020/0052957 A1 Feb. 13, 2020

(51) Int. Cl.
*H04L 12/24* (2006.01)
*H04L 29/08* (2006.01)

(52) U.S. Cl.
CPC ............ *H04L 41/08* (2013.01); *H04L 67/10* (2013.01)

(58) Field of Classification Search
CPC ........ H04L 47/11; H04L 47/27; H04L 43/16; H04L 43/026; H04L 43/0894; H04L 49/70; H04W 28/0289
USPC ........................................................ 709/223
See application file for complete search history.

(56) References Cited

U.S. PATENT DOCUMENTS

| | | | | |
|---|---|---|---|---|
| 9,002,828 B2* | 4/2015 | Fiatal | .................. | G06F 16/9574 707/722 |
| 9,553,821 B2* | 1/2017 | Xiao | ....................... | H04L 47/70 |
| 10,002,011 B2* | 6/2018 | Lissack | ............... | H04L 41/5054 |
| 10,257,082 B2* | 4/2019 | Hughes | .................. | H04L 69/22 |
| 10,454,940 B2* | 10/2019 | Lander | .................. | H04L 63/102 |
| 10,469,404 B1* | 11/2019 | Mao | ......................... | H04L 67/16 |
| 10,484,291 B2* | 11/2019 | Robitaille | ............. | H04L 47/283 |
| 2008/0008095 A1* | 1/2008 | Gilfix | ....................... | H04L 47/10 370/235 |
| 2013/0343191 A1* | 12/2013 | Kim | ....................... | H04L 47/762 370/235 |

(Continued)

OTHER PUBLICATIONS

"Spring Cloud", Last updated Aug. 23, 2016 16:00:48 +02:00, <http://cloud.spring.io/spring-cloud-static/Brixton_SR5/>, 206 pages (file split into two parts).

(Continued)

*Primary Examiner* — Tauqir Hussain
(74) *Attorney, Agent, or Firm* — Andrew Aubert

(57) ABSTRACT

Coordination of rate limiting calculations and updates, for multiple interrelated services, at a single computer at a single logical location on a computer network, instead of coordinating rate limit calculations by direct data communications among and between the various machines hosting the interrelated services that are subject to rate limiting. In some of these embodiments, advantages to doing this may include: (i) reducing the number and/or bandwidth consumption of data communications needed to perform rate limiting calculations and determinations; and/or (ii) setting appropriate rate limits for only the "highest level" services (that is, the services that are initially called by users, as opposed to the services that the highest level service call (directly or indirectly)).

18 Claims, 4 Drawing Sheets

(56) References Cited

U.S. PATENT DOCUMENTS

2016/0048408 A1* 2/2016 Madhu ............... G06F 11/2097
718/1

OTHER PUBLICATIONS

Kishore et al., "Cloud Bouncer—Distributed Rate Limiting at Yahoo", Yahoo! Engineering, A peek under the purple rug! Feb. 17, 2015, 8 pages, <https://yahooeng.tumblr.com/post/111288877956/cloud-bouncer-distributed-rate-limiting-at-yahoo>.
Raghavan et al., "Cloud Control with Distributed Rate Limiting." SIGCOMM '07, Aug. 27-31, 2007, Kyoto, Japan. pp. 337-348.

* cited by examiner

CENTRALIZED RATE LIMITERS FOR SERVICES IN CLOUD BASED COMPUTING ENVIRONMENTS

BACKGROUND

The present invention relates generally to the field of cloud based service environments, and more particularly to providing services in a service oriented architecture deployed in a cloud based computing environment.

A service oriented architecture (SOA) is a style of executing a computer program, or software design, where services are provided to the other components by application components through a communication protocol over a network (often the internet or a cloud network). Typical basic principles of SOA are independent of vendors, products and/or technologies. A service is a discrete unit of functionality that can be accessed remotely and acted upon and updated independently, such as retrieving a utility account statement online. A typical service has four properties: (i) it logically represents a business activity with a specified outcome; (ii) it is self-contained; (iii) it is a black box for its consumers; and (iv) it may consist of other underlying services. Different services can be used together to provide the functionality of a large computer program, or software application. SOA is typically less about how to modularize an application, and more about how to compose an application by integrating distributed, separately-maintained and deployed software components. SOA is typically enabled by technologies and standards that make it easier for components to communicate and cooperate over a network, especially an IP (internet protocol) network.

One implementation of service oriented architecture typical in the current state of the art is Kubernetes (commonly stylized as K8s). Kubernetes is an open-source container-orchestration system for automating deployment, scaling and management of containerized applications, including services as described above. An application or service that has been containerized is packaged with a virtualized environment for running the application, instead of requiring a virtual machine on a host computer for the containerized application to run.

Identity management, also known as identity and access management (IAM) is, in the field of computer security, a security and/or business discipline for "enabling the right individuals to access the right resources at the right times and for the right reasons." IAM addresses the need to ensure appropriate access to resources across increasingly heterogeneous technology environments and to meet increasingly rigorous compliance requirements set forth by law in diverse geographical settings. The terms "identity management" (IdM) and "identity and access management" are often used interchangeably in the area of Identity access management. Identity-management systems, products, applications and platforms manage identifying and ancillary data about entities that typically include individuals, computer-related hardware, and software applications. IAM covers issues such as how users gain an identity, the protection of that identity, what resources that identity is allowed to access, and the technologies supporting that protection (e.g., network protocols, digital certificates, passwords, etc.).

One typical service known in the art for implementing IAM is XACML, which stands for "eXtensible Access Control Markup Language" and is a standard that defines a declarative fine-grained, attribute-based access control policy language, an architecture, and a processing model describing how to evaluate access requests according to a set of rules defined within policies. XACML is primarily an Attribute-Based Access Control system (ABAC), where attributes (bits of data and/or metadata) associated with a user or action or resource are inputs into the decision making process of whether the given user may be granted access to a given resource in a particular way. Role-based access control (RBAC) can also be implemented in XACML as a specialization of ABAC. One recognized advantage of the XACML model is that it supports and encourages separating the access decision from the point of use. When access decisions are included within the client applications (or alternatively, based on local machine user IDs and Access Control Lists (ACLs)), it is very difficult to update the decision criteria when the governing policy changes. When the client is decoupled from the access decision, such as in XACML, it is possible to update authorization policies on the fly and affect all clients immediately.

Individual services hosted within datacenters typically use rate-limiting to control the share of resources given to different tenants and applications according to their service level agreement (SLA). Rate-limiting typically limits the amount of requests for computing services that user(s) can make within a unit of time, from a geographical area and/or from a logical location(s) on a computer network. A variety of rate-limiting techniques are applied in typical datacenters, using a combination of software and hardware. Three types of rate-limiting are: (i) user rate limiting (that is, limiting a number of requests a user is making to their API key or IP—typically, if the user exceeds the rate limit, then any further requests will be denied until they reach out to the developer to increase the limit or wait until the rate limit timeframe resets; (ii) geographic rate limiting (sets rate limits for particular regions and particular time periods); and (iii) server rate limiting. Virtualized datacenters in some implementations also apply rate-limiting at the hypervisor layer if using virtual machines. Two important performance metrics of rate-limiters in datacenters are resource footprint (memory and CPU usage). These resource footprint parameter values impact scalability and precision.

Some conventional SOA service providing systems use "distributed rate limiting." In these distributed rate limiting systems, each computer of a set of host computers for one or more services implements a distributed rate limiter protocol that shares traffic information for a given host computer to every other host computer that is part of the set, to build a consensus of traffic information and rate limits amongst a set of computers hosting the various SOA services. This type of communication between host computers is sometimes described as "gossip protocol." If there are 8 host computers in this type of implementation, each host computer sends out 7 communications, with each communication including their rate limit information, for a total of 56 communications being sent and received (and processed) by each host computer on each round of rate limiting related communications. If there are 9 host computers, the number of communications increases to 72. If the number of host computers increases to 18, the number of communications increases to 306.

SUMMARY

According to one aspect of the present invention, a method, computer program product and/or computer system perform the following operations (not necessarily in the following order: (i) receiving a service oriented architecture (SOA) services interdependency data set that includes information indicative of: (a) identity of a plurality of interrelated SOA services, (b) dependencies among and between the SOA services of the plurality of interrelated SOA services; (c) identification of top level SOA services of the plurality of interrelated SOA services that may be directly called by clients, and (d) capacity information for each SOA service of the plurality of interrelated SOA services; (ii) for each given top level SOA service of the plurality of SOA services and only for the top level SOA services of the plurality of SOA services, determining a set of rate limit value(s) for the given top level SOA service based upon: (a) capacity information for the given top level SOA service, (b) capacity information for any SOA services of the plurality of interrelated services upon which the given top level service directly depends, and (c) capacity information for any SOA services of the plurality of interrelated services upon which the given top level service indirectly depends; and (iii) operating the plurality of interrelated services by servicing user requests to the top level SOA services in a manner that: (a) is governed by the set of rate limit value(s) for the top level SOA services, and (b) does not apply rate limiting at the SOA services of the plurality of SOA services that are not top level SOA services.

According to a further aspect of the present invention, a method and/or computer program product is used with a computer system including a centralized rate limiting machine and a plurality of host machines that respectively host a plurality of interrelated SOA services. The method, computer program product and/or computer system performs the following operations (not necessarily in the following order): (i) receiving, by the centralized rate limiting machine, over a computer network and from the plurality of host machines, a service oriented architecture (SOA) services interdependency data set that includes information indicative of: (a) identity of the plurality of interrelated SOA services, (b) dependencies among and between the SOA services of the plurality of interrelated SOA services; and (c) capacity information for each SOA service of the plurality of interrelated SOA services; (ii) determining, by the centralized rate limiting machine, a set of rate limit value(s) respectively for at least some of the SOA services of the plurality of interrelated SOA services based upon the service oriented architecture (SOA) services interdependency data set; (iii) sending, by the centralized rate limiting machine, over the computer network and to at least some of the plurality of host machines, the set of rate limiting value(s) corresponding to the SOA service hosted on the host machine; and (iv) operating the plurality of interrelated services by servicing user requests to the top level SOA services in a manner that is governed by the sets of rate limit value(s).

According to a further aspect of the present invention, a method and/or computer program product is used with a computer system including a centralized rate limiting machine and a plurality of host machines that respectively host a plurality of interrelated SOA services. The method, computer program product and/or computer system performs the following operations (not necessarily in the following order): (i) receiving, by the centralized rate limiting machine, over a computer network and from the plurality of host machines, a service oriented architecture (SOA) services interdependency data set that includes information indicative of: (a) identity of a plurality of interrelated SOA services, (b) dependencies among and between the SOA services of the plurality of interrelated SOA services; (c) identification of top level SOA services of the plurality of interrelated SOA services that may be directly called by clients, and (d) capacity information for each SOA service of the plurality of interrelated SOA services; (ii) for each given top level SOA service of the plurality of SOA services and only for the top level SOA services of the plurality of SOA services, determining, by the centralized rate limiting machine, a set of rate limit value(s) for the given top level SOA service based upon: (a) capacity information for the given top level SOA service, (b) capacity information for any SOA services of the plurality of interrelated services upon which the given top level service directly depends, and (c) capacity information for any SOA services of the plurality of interrelated services upon which the given top level service indirectly depends; (iii) sending, by the centralized rate limiting machine, over the computer network and each given host machine that hosts a given top level SOA service, the set of rate limiting value(s) corresponding to the given top level SOA service; and (iv) operating the plurality of interrelated services by servicing user requests to the top level SOA services in a manner that: (a) is governed by the set of rate limit value(s) for the top level SOA services, and (b) does not apply rate limiting at the SOA services of the plurality of SOA services that are not top level SOA services.

DETAILED DESCRIPTION

Figure 1:
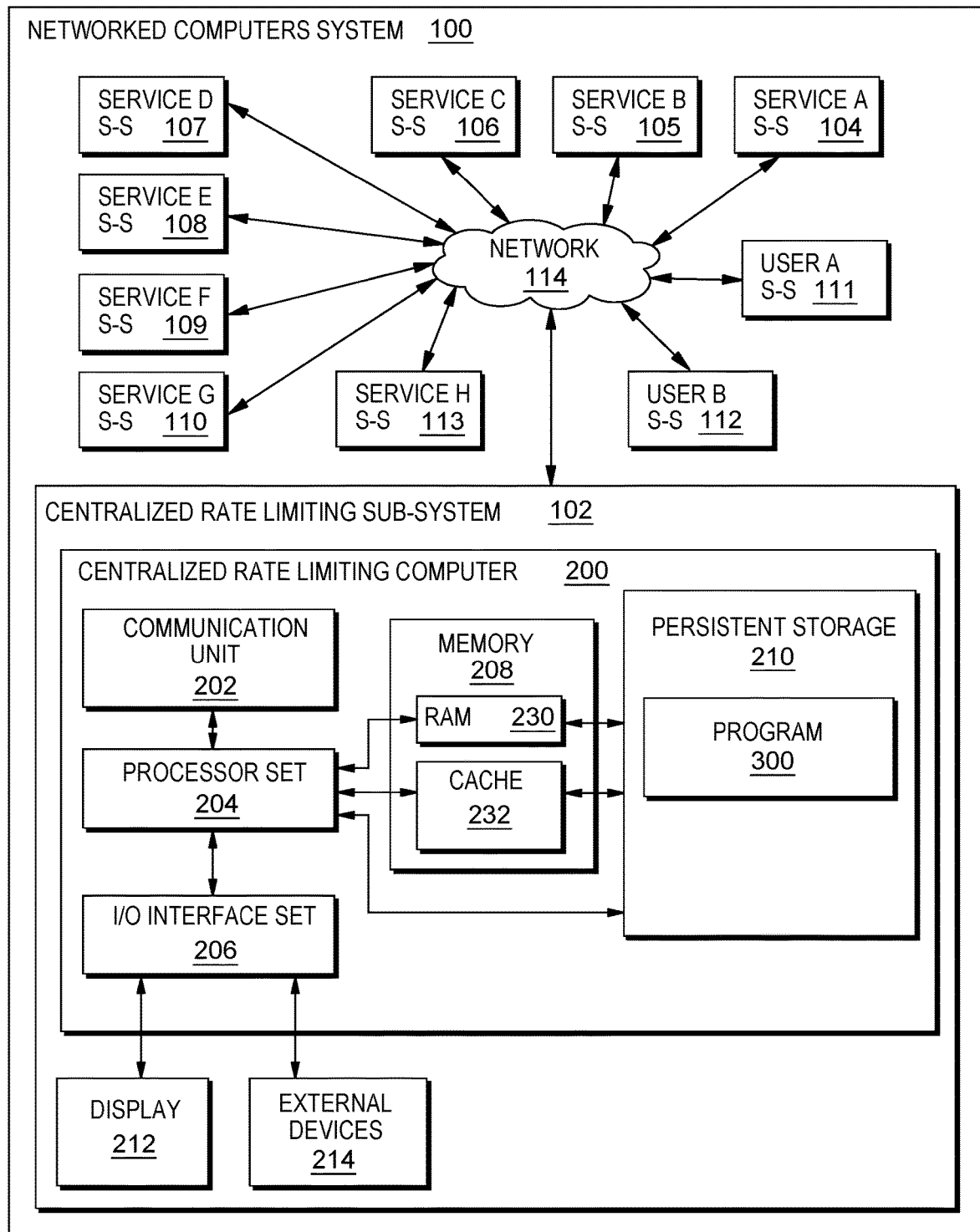
FIG. 1 is a block diagram view of a first embodiment of a system according to the present invention.

Some embodiments of the present invention coordinate rate limiting calculations and updates, for multiple interrelated services, at a single computer at a single logical location on a computer network, instead of coordinating rate limit calculations by direct data communications among and between the various machines hosting the interrelated services that are subject to rate limiting. In some of these embodiments, advantages to doing this may include: (i) reducing the number and/or bandwidth consumption of data communications needed to perform rate limiting calculations and determinations; and/or (ii) setting appropriate rate limits for only the "highest level" services (that is, the services that are initially called by users, as opposed to the services that the highest level service call (directly or indirectly)). This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: centralized rate limiter sub-system 102 (or, more simply, sub-system 102); service A hosting sub-system 104 (which is in the form of a server computer); service B hosting sub-system 105; service C hosting sub-system 106; service D hosting sub-system 107; service E hosting sub-system 108; service F hosting sub-system 109; service G hosting sub-system 110; user A sub-system 111; user B sub-system 112; service H hosting sub-system 113; and; communication network 114. Sub-system 102 includes: centralized rate limiting computer 200; display device 212; and external device set 214. Centralized rate limiting computer includes: communication unit 202; processor set 204; input/output (I/O) interface set 206; memory device 208; persistent storage device 210; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
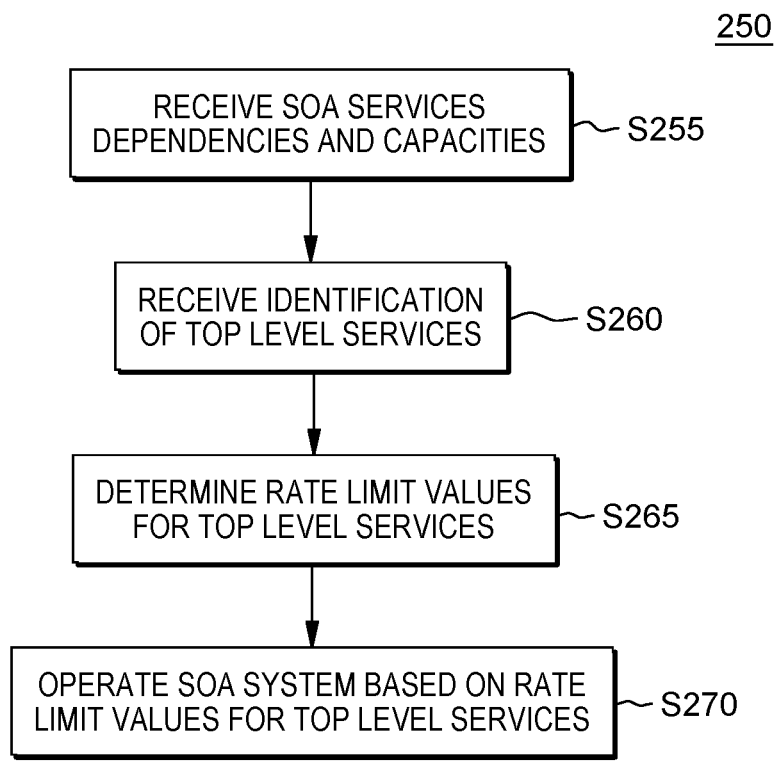
FIG. 2 is a flowchart showing a first embodiment method performed, at least in part, by the first embodiment system.
Figure 3:
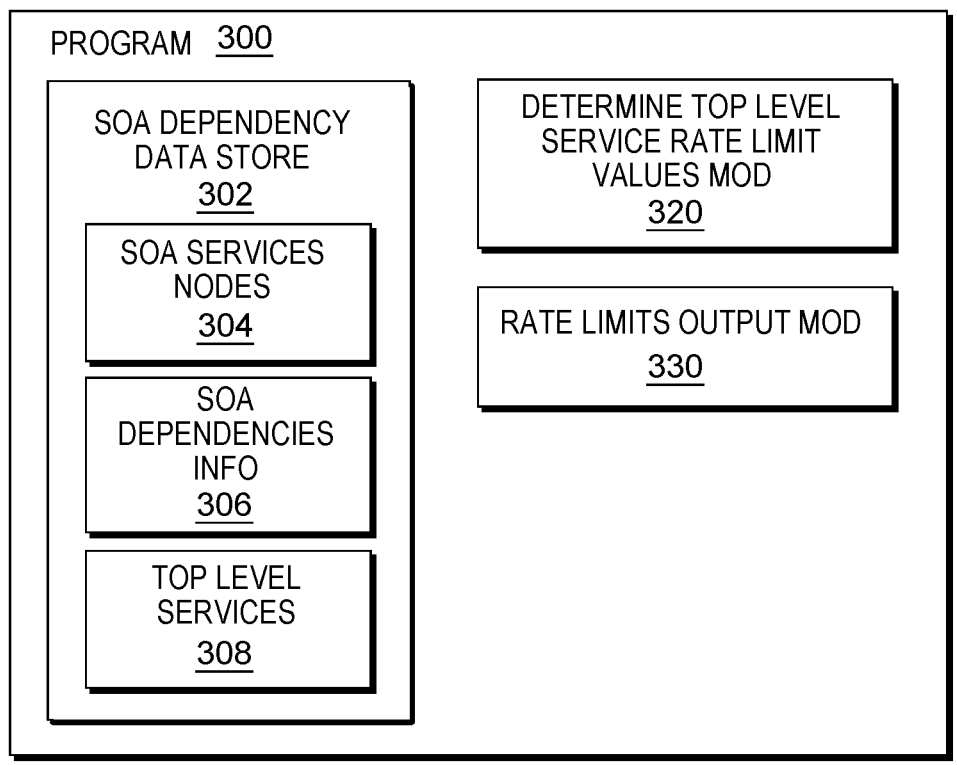
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where data about the SOA services to be used in the operation of the SOA system (see FIG. 1) is stored in SOA interdependency data store 302. More specifically, this data store includes: (i) identification of the service nodes (stored at SOA services node 304 of data store 302); (ii) respective capacities of the service nodes (also stored at SOA services node 304 of data store 302); and (iii) SOA dependencies information (stored at SOA dependencies info 306 of data store 302). These various types of information will now be discussed in the following paragraphs with reference to dependency graph 400 of FIG. 4.

IDENTIFICATION OF SERVICE NODES: In this simplified example SOA system, the SOA services are: (i) service A (hosted by service A sub-system 104, see FIG. 1); (ii) service B (hosted by service B sub-system 105, see FIG. 1); (iii) service C (hosted by service C sub-system 106, see FIG. 1); (iv) service D (hosted by service D sub-system 107, see FIG. 1); (v) service E (hosted by service E sub-system 108, see FIG. 1); (vi) service F (hosted by service F sub-system 109, see FIG. 1); (vii) service G (hosted by service G sub-system 110, see FIG. 1); and (viii) service H (hosted by service H sub-system 113, see FIG. 1). Each of these services is shown as a node in dependency graph 400.

CAPACITIES: Each of the services has an associated capacity. That is to say, each service has some number of requests per unit time that it can reliably handle. These capacities will be used to calculate the rate limits for the top level services in the system, as will be discussed further, below. In this simplified example, the capacity for each service A to H is 6 requests per second.

DEPENDENCIES: Dependency graph 400 show dependencies by arrows drawn from one node to another to shown that the source node of the arrow is dependent upon the target node of the arrow. In operation, this means that when the source node service is called, then it calls the target node(s) upon which it is dependent. As is understood in the art, a dependent node may call node(s) upon which it is, in turn, dependent.

DIRECT SERVICE REQUESTS: Dependency graph 400 shows direct service requests as arrows stemming down from solid black circles near the top of the figure, representing incoming requests for services from sources external to the SOA represented in dependency graph 400. These requests might be initiated directly by a user through a computer device or might be called by a different SOA environment.

SECONDARY SERVICE REQUESTS: Dependency graph 400 shows secondary service requests as arrows drawn from one node to another and is also known above as DEPENDENCIES.

Figure 4:
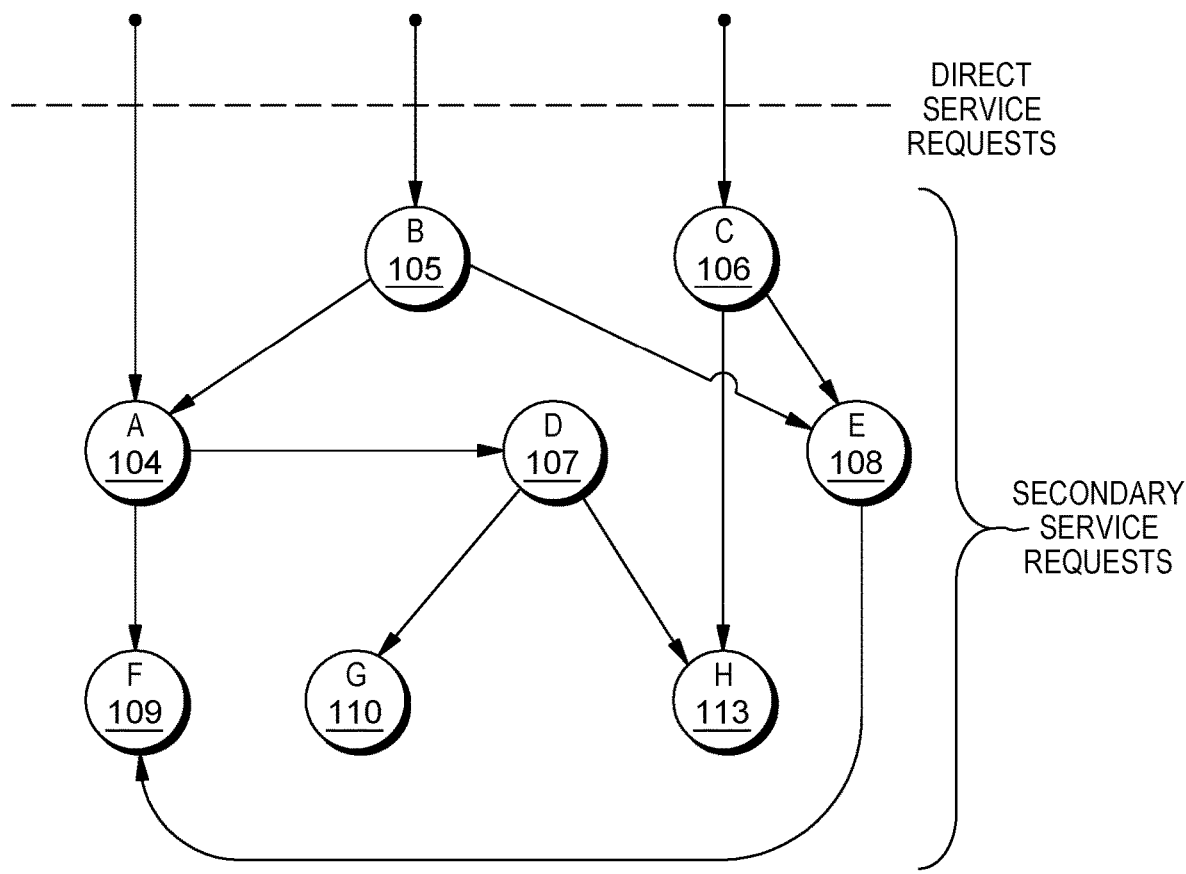
FIG. 4 is a dependency graph for SOA services used by the first embodiment system.

Processing proceeds to operation S260, where the identification of "top level services" is received at top level services 308 of SOA dependency store 302. Top level services are those services which can receive requests directly from users. Top level services do not include services that only receive requests from other services. Turning attention to FIG. 4, dependency graph 400 shows that the top level services in this simple example are service A, service B and service C.

Processing proceeds to operation S265, where determine top level service rate limit value module ("mod") 320 determines rate limit values only for the top level services (that is services A, B and C in this simple example). There are various ways of calculating the top level service rate limit values, but a simple algorithm for making such calculations will now be discussed in the following paragraphs.

First, it is determined how many times each service will be called if each top level service gets one request for service—that is, it is assumed that services A, B and C each receive one request for service (from users A and B (see FIG. 1 at user A sub-system 111 and user B sub-system 112). Alternatively, it could be assumed that different top level services get different numbers of service requests from users to effectively give different priority levels to the various top level services. By consulting dependency graph 400 it can be seen that, under this assumption of one user request to each top level service, the number of calls to each of the services A to H will be as follows:

SERVICE A: gets two (2) calls—one from the user request directly to service A and one based on the user request made to service B.

SERVICE B: gets one (1) call—that is, the user request directly to service B.

SERVICE C: gets one (1) call—that is, the user request directly to service C.

SERVICE D: gets two (2) calls—one based on the user request to service A and one based on the user request made to service B.

SERVICE E: gets two (2) calls—one based on the user request to service B and one based on the user request made to service C.

SERVICE F: gets three (3) calls—one based on the user request to service A, one based on the user request to service B and one based on the user request made to service C.

SERVICE G: gets two (2) calls—one based on the user request to service A and one based on the user request made to service B.

SERVICE H: gets three (3) calls—one based on the user request to service A, one based on the user request to service B and one based on the user request made to service C.

Calculations now proceed to determination of the rate limiting values for top level services A, B and C. Because services F and H each receive three service calls when one user request is sent to each of services A, B and C, this means that each of services A, B and C can handle two (2) requests per second. To explain further, if services A, B and C get two (2) requests per second then services F and H will each receive six (6) service calls per second, which is their maximum capacity. So, two (2) requests per second will be set as the rate limit values for each of the top level services in this simple example. As will be understood by those of skill in the art, calculations can become much more complicated when the dependency graph has more nodes and a more complex web of dependencies. This simple example, is only intended to illustrate the concept of how capacities and dependencies are used as a basis for calculating top level service rate limit values.

Processing proceeds to operation S270, where the SOA system is operated using the rate limit values for the top level services. The services that are not top level service do not need to be independently rate limited because their respective capacity limits (specifically, the capacity limits of services F and G) have already been accounted for in determining the rate limit values for the top level services. In this example, rate limits output mod 330 outputs the rate limit values to the top level services to service A sub-system 104, service B sub-system 105 and service C 106 where they are effected locally (according to any rate limiting techniques now known or to be developed in the future). Alternatively, the rate limiting could be effected at another computer (such as centralized rate limiting computer 200) as long as this doesn't slow operations down too much. It is noted that setting the rate limits at a centralized rate limiting sub-system reduces the number of rate limiting communications that must be made among and between the various service hosting sub-systems.

III. Further Comments and/or Embodiments

Some embodiments of the present invention recognize the following facts, potential problems and/or potential areas for improvement with respect to the current state of the art: (i) current state of the art for Rate Limiters (RLs) does not account for the inter-service dependencies of cloud computing; (ii) the most advanced features of RLs (listed in this section) have a major drawback: the conditions, reg/ex, discovery, learning, all add more RL rules to the decision point on the node or service they are protecting; (iii) this adds to the processing and response time of the service, i.e. complex RL features slow down the service they are trying to protect; (iv) the most advanced features and current state of the art of Rate Limiters act/protect from a single node perspective or at best allow for a common policy to be applied across nodes of similar function; (v) some of the current state of the art RLs include: conditional modes, discovery/learning modes, labeling, blacklist, expiring labels, reg/ex, and control plan policing; (vi) Rate Limiters (RL) prevent denial of service attacks and can prioritize service, usually web-service, requests and response; (vii) rate limiters solutions have been around for many years and include learning capabilities; (viii) these learning capabilities still consist of a single service point of view; (ix) in today's cloud configurations it is common for that initial service to call multiple backend service; (x) several internet edge services may call the same backend services; (xi) commonly the initial internet facing edge service may rely upon a chain of backend service calls to satisfy a single request; and/or (xii) it is also common for each of the service to deploy a rate limiter which protects each individual service in the chain from being overrun.

Some embodiments of the present invention may include one, or more, of the following features, characteristics and/or advantages: (i) use a cloud monitoring system to provide insight into the multi-service processing flow to coordinate and adjust the rate limiters within the individual services; (ii) this provides a balanced service to service processing flow and reduces the number of rules within the RL which increases the RL runtime speeds; (iii) using a cloud service monitoring tool to also monitor the service's RLs settings and triggers to dynamically and "cognitively" load balance the frontend and service to service call flow to increase overall performance and reduce failover thrashing; (iv) the algorithms vary but all with the intended goal of reducing internal service's RLs from returning hypertext transfer protocol (HTTP) error codes (429, 503 typically); (v) it is not a load balancer, instead it pushes the RL enforcement to the edge nodes; and/or (vi) this allows the internal services of the cloud to work more efficiently because they are not processing a request which is only destined to be denied by a deep internal service RL.

Figure 5:
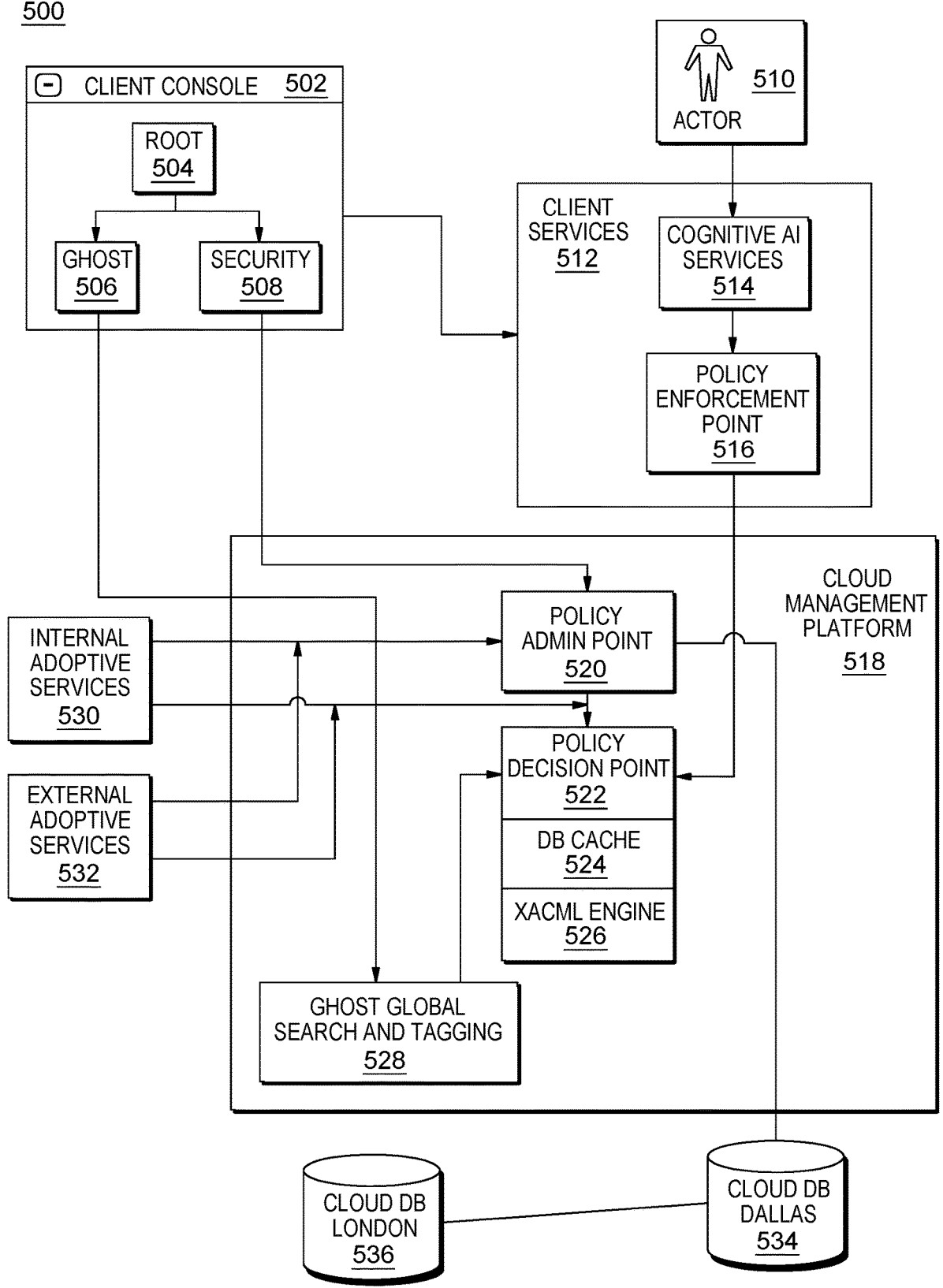
FIG. 5 is a block diagram view of a second embodiment of a system according to the present invention.

An embodiment of a possible hardware and software environment for software and/or methods according to the present invention will now be described with reference to FIG. 5. FIG. 5 is a functional block diagram that describes an example cloud environment 500 including: (i) client console 502; (ii) root 504; (iii) GHOST 506; (iv) security 508; (v) actor 510; (vi) client services 512; (vii) cognitive AI services 514; (viii) policy enforcement point 516; (ix) cloud management platform 518; (x) policy admin point 520; (xi) policy decision point 522; (xii) database (DB) cache 524; (xiii) XACML engine 526; (xiv) GHOST global search and tagging 528; (xv) internal adoptive services 530; (xvi) external adoptive services 532; (xvii) cloud DB Dallas 534; and (xviii) cloud DB London 536.

In example cloud environment 500, before any requests can be initiated by actor 510, internal adoptive services 530, or external adoptive services 532, cloud management platform 518 must be calibrated to accommodate such requests. Calibration can include client console 502, root 504, security 508, internal adoptive services 530 and external adoptive services 532 providing identity access management (IAM) information to policy admin point 520, which is then propagated to cloud databases cloud DB Dallas 534 and cloud DB London 536. GHOST 506 provides search and tagging related data to GHOST global search and tagging block 528, which in turn provides search and tagging related data to policy decision point 522.

In this example, actor 510 initiates a request to access cognitive AI services 514, a cloud based service, of client services 512. Before actor 510 can be provided access to cognitive AI services 514, policy enforcement point 516 verifies that actor 510 has appropriate privileges to access cognitive AI services 514. This verification process proceeds to policy decision point 522, which queries cloud databases cloud DB Dallas 534 and cloud DB London 536 through XACML engine 526, using global search and tagging supplied by GHOST 506 in GHOST global search and tagging 528, for identity access management related to the request of actor 510 and stores the queried information in DB cache 524. Policy decision point 522 verifies this request and grants actor 510 the requested access to cognitive AI services 514 of client services 512. While policy decision point 522 provides IAM services for requests to access cognitive AI services 514, it also provides IAM services for internal adoptive services 530 and external adoptive services 532. In this example, policy enforcement point 516, policy decision point 522, XACML engine 526, and cloud DB Dallas 534 and cloud DB London 536 each individually have a rate limit applied to them, respectively defining the upper limit of requests that they can process for a given unit of time. In this example, the following rate limits at the moment of the request by actor 510 are given for the following services: (i) policy decision point 522 has a rate limit of processing 100 requests for IAM services per second; (ii) cloud databases cloud DB Dallas 534 and cloud DB London 536 have rate limits of 30 requests per second; (iii) policy enforcement point 516 has a limit of 75 requests per second; and (iv) XACML engine 526 has a limit of 60 requests per second.

Typically, rate limits are defined dynamically by each given service based on underlying computer hardware and current processing conditions. If hardware for a given service suffers a failure or receives improvements, the rate limit would decrease or increase, respectively. If a different client service requires a minimum amount of available processing availability and has a higher priority, the rate limit of that service for a given client service would experience a decrease. This dynamic determination of rate limits costs some amount of processing availability provided to the service, with more advanced determinations requiring additional processing availability. One embodiment of the present invention determines which service (in this example, cloud DB Dallas 534 and cloud DB London 536) has the lowest rate limit within a chain of services required to complete a request and adjusts the rate limiters of all services in the chain to match, preventing requests from near the beginning of the chain to begin, only for a service further down the chain to cause a failure as a result of reaching the service rate limiter.

Some embodiments of the present invention may include one, or more, of the following features, characteristics and/or advantages: (i) IAM has four geographical (Geo) zones; (ii) in each Geo zone they are two availability zones; (iii) each availability zone consent contains several instances of IAM services; (iv) each Geo only has a singular cloud based database; (v) requests are spread out, load balancing and active-active failover; (vi) like any cloud service, there can be a single choke point; (vii) in this example it is the cloud based database; (viii) every authorization call for all services such as writes or reads to a services that have adopted IAM, must check the access policies in the cloud based database service; (ix) IAM typically resolves these request in 30 ms; (x) Rate limiters are (or in planning) placed in front of every service throughout these call paths; (xi) there is also a rate limiter on the cloud based database; (xii) if the cloud database rate limiters started reading and triggering service outages above them it would cause a fail over; (xiii) using built in service monitors, which are typically monitoring the health of the service, to also include data on their rate limiters and win those rate limiters are triggering; (xiv) this rate limit data goes to a single service that uses an algorithm to make a decision to balance the rate limiting across all of the services in the call path to reduce incidences of service requests returning failures; (xv) these failures include http responses 429 (too many requests) and 503 (service outage); and/or (xvi) include other load balancers (for example, Dyn and Kubernetes) into the algorithm to automate their failover triggers.

Some embodiments of the present invention may include one, or more, of the following features, characteristics and/or advantages: (i) using a central controlled rate limiter across multiple services to improve efficiency and scale as opposed to distributed rate limiting models; (ii) the centralized system provides a global holistic view required for global data center service distributions across multiple Geo zones; (iii) for example, one cloud service console is experienced as a single instance despite that it is globally distributed across many different Geo zones including: Dallas (USA), Montreal (Canada), Sao Paolo (Brazil), Toronto (Canada), Washington D.C. (USA), London (UK), Frankfurt (Germany), Sydney (Australia) and Tokyo (Japan); (iv) the central control model can apply Network Flow and other modeling; (v) the central control model can make holistic and intelligent corrective throttling policy changes; (vi) the central control model orchestrates pushing new policies to all of the rate limiters to adjust their parameters to rectify issues; (vii) not all service requests have equal costs; (viii) for example, one service request may be relatively light, such as a ping request; (ix) this is in contrast to a request that requires the service to allocate memory, call a database, etc; (x) the central control model of some embodiments of the present invention provides a technique to determine a holistic view and corrective actions; (xi) rate limiters herein relate to computer processing, storage impacts, and other hardware limitations of computers in a cloud based service; (xii) network bandwidth is not typically an issue that concerns rate limiters in cloud based service environments, because network traffic is mostly short, chatty, request/response packets; (xiii) each packet is a request/response that requires a lot of computer processing or storage impacts; (xiv) network bandwidth or lack thereof never comes into play from the perspective of the rate limiter; and/or (xv) some embodiments of the present invention are directed towards reducing instances of a cloud service from being overrun by requests that causing the cloud service to exhaust all of their compute/CPU or storage resources.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
   receiving a service oriented architecture (SOA) services interdependency data set that includes information indicative of: (i) identity of a plurality of interrelated SOA services, (ii) dependencies among and between the SOA services of the plurality of interrelated SOA services; (iii) identification of top level SOA services of the plurality of interrelated SOA services that may be directly called by clients, and (iv) capacity information for each SOA service of the plurality of interrelated SOA services;
   for each given top level SOA service of the plurality of SOA services and only for top level SOA services of the plurality of SOA services, determining a set of rate limit value(s) for the given top level SOA service based upon: (i) capacity information for the given top level SOA service, (ii) capacity information for any SOA services of the plurality of interrelated services upon which the given top level service directly depends, and (iii) capacity information for any SOA services of the plurality of interrelated services upon which the given top level service indirectly depends; and
   operating the plurality of interrelated services by servicing user requests to the top level SOA services in a manner that: (i) is governed by the set of rate limit value(s) for the top level SOA services, and (ii) does not apply rate limiting at the SOA services of the plurality of SOA services that are not top level SOA services.

2. The CIM of claim 1 wherein the determination of the set of rate limit value(s) is performed by a cloud management platform.

3. The CIM of claim 1 further comprising:
using a cloud monitoring system to provide insight into multi-service processing flow to coordinate.

4. The CIM of claim 1 further comprising:
providing a balanced service to service processing flow.

5. The CIM of claim 1 further comprising:
reducing a number of rate limiting rules to increase rate limiting runtime speeds.

6. The CIM of claim 1 further comprising:
using a cloud service monitoring tool to monitor rate limit settings of services and triggers to dynamically load balance a frontend and service to service call flow to increase overall performance and reduce failover thrashing.

7. A computer-implemented method (CIM) for use with a computer system including a centralized rate limiting machine and a plurality of host machines that respectively host a plurality of interrelated SOA services, the method comprising:
receiving, by the centralized rate limiting machine, over a computer network and from the plurality of host machines, a service oriented architecture (SOA) services interdependency data set that includes information indicative of: (i) identity of the plurality of interrelated SOA services, (ii) dependencies among and between the SOA services of the plurality of interrelated SOA services; and (iii) capacity information for each SOA service of the plurality of interrelated SOA services;
determining, by the centralized rate limiting machine, a set of rate limit value(s) respectively for at least some of the SOA services of the plurality of interrelated SOA services based upon the service oriented architecture (SOA) services interdependency data set;
sending, by the centralized rate limiting machine, over the computer network and to at least some of the plurality of host machines, the set of rate limiting value(s) corresponding to the SOA service hosted on the host machine; and
operating the plurality of interrelated services by servicing user requests to top level SOA services in a manner that is governed by the set of rate limit value(s).

8. The CIM of claim 7 wherein the determination of the set of rate limit value(s) is performed by a cloud management platform.

9. The CIM of claim 7 further comprising:
using a cloud monitoring system to provide insight into multi-service processing flow to coordinate.

10. The CIM of claim 7 further comprising:
providing a balanced service to service processing flow.

11. The CIM of claim 7 further comprising:
reducing a number of rate limiting rules to increase rate limiting runtime speeds.

12. The CIM of claim 7 further comprising:
using a cloud service monitoring tool to monitor rate limit settings of services and triggers to dynamically load balance a frontend and service to service call flow to increase overall performance and reduce failover thrashing.

13. A computer-implemented method (CIM) for use with a computer system including a centralized rate limiting machine and a plurality of host machines that respectively host a plurality of interrelated SOA services, the method comprising:
receiving, by the centralized rate limiting machine, over a computer network and from the plurality of host machines, a service oriented architecture (SOA) services interdependency data set that includes information indicative of: (i) identity of a plurality of interrelated SOA services, (ii) dependencies among and between the SOA services of the plurality of interrelated SOA services; (iii) identification of top level SOA services of the plurality of interrelated SOA services that may be directly called by clients, and (iv) capacity information for each SOA service of the plurality of interrelated SOA services;
for each given top level SOA service of the plurality of SOA services and only for top level SOA services of the plurality of SOA services, determining, by the centralized rate limiting machine, a set of rate limit value(s) for the given top level SOA service based upon: (i) capacity information for the given top level SOA service, (ii) capacity information for any SOA services of the plurality of interrelated services upon which the given top level service directly depends, and (iii) capacity information for any SOA services of the plurality of interrelated services upon which the given top level service indirectly depends;
sending, by the centralized rate limiting machine, over the computer network and each given host machine that hosts a given top level SOA service, the set of rate limiting value(s) corresponding to the given top level SOA service; and
operating the plurality of interrelated services by servicing user requests to the top level SOA services in a manner that: (i) is governed by the set of rate limit value(s) for the top level SOA services, and (ii) does not apply rate limiting at the SOA services of the plurality of SOA services that are not top level SOA services.

14. The CIM of claim 13 further comprising:
using a cloud monitoring system to provide insight into multi-service processing flow to coordinate.

15. The CIM of claim 13 further comprising:
providing a balanced service to service processing flow.

16. The CIM of claim 13 further comprising:
reducing a number of rate limiting rules to increase rate limiting runtime speeds.

17. The CIM of claim 13 further comprising:
using a cloud service monitoring tool to monitor rate limit settings of services and triggers to dynamically load balance a frontend and service to service call flow to increase overall performance and reduce failover thrashing.

18. The CIM of claim 13 wherein the determination of the set of rate limit value(s) is performed by a cloud management platform.

* * * * *